United States Patent
Chellappa et al.

(10) Patent No.: US 7,077,889 B2
(45) Date of Patent: Jul. 18, 2006

(54) SURFACE MODIFICATION OF POROUS METAL SUBSTRATES

(75) Inventors: Anand Chellappa, Albuquerque, NM (US); Charles Call, Albuquerque, NM (US); Michael Powell, Kennewick, WA (US)

(73) Assignee: Intelligent Engery, Inc., Long Beach, CA (US)

( * ) Notice: Subject to any disclaimer, the term of this patent is extended or adjusted under 35 U.S.C. 154(b) by 17 days.

(21) Appl. No.: 10/408,058

(22) Filed: Apr. 4, 2003

(65) Prior Publication Data

US 2004/0194626 A1  Oct. 7, 2004

(51) Int. Cl.
*B01D 53/22* (2006.01)
*B01D 71/02* (2006.01)

(52) U.S. Cl. .................... 96/11; 95/56; 55/524; 55/DIG. 5; 427/534; 427/551; 427/553

(58) Field of Classification Search .......... 55/524, 55/DIG. 5; 95/55, 56; 96/4, 11; 427/487, 427/551, 532–535, 553
See application file for complete search history.

(56) References Cited

U.S. PATENT DOCUMENTS

| | | | | |
|---|---|---|---|---|
| 2,958,391 | A | * 11/1960 | DeRosset | 95/56 |
| 3,428,476 | A | * 2/1969 | Myers et al. | 427/229 |
| 4,526,839 | A | 7/1985 | Herman et al. | |
| 5,302,414 | A | 4/1994 | Alkhimov et al. | |
| 5,316,802 | A | * 5/1994 | Ebe et al. | 427/533 |
| 5,498,278 | A | * 3/1996 | Edlund | 96/11 |
| 5,738,708 | A | * 4/1998 | Peachey et al. | 95/56 |
| 6,077,621 | A | * 6/2000 | Allen et al. | 429/33 |
| 6,152,987 | A | * 11/2000 | Ma et al. | 95/56 |
| 6,315,820 | B1 | * 11/2001 | Saloka et al. | 96/11 |
| 6,319,566 | B1 | * 11/2001 | Polanyi et al. | 427/533 |
| 6,368,664 | B1 | * 4/2002 | Veerasamy et al. | 427/249.7 |
| 6,408,928 | B1 | 6/2002 | Heinrich et al. | |
| 6,730,364 | B1 | * 5/2004 | Hong et al. | 427/535 |
| 6,743,369 | B1 | * 6/2004 | Jito et al. | 216/13 |
| 2001/0051231 | A1 | * 12/2001 | Muffoletto et al. | 427/533 |
| 2001/0055694 | A1 | 12/2001 | Wada et al. | |
| 2002/0062738 | A1 | * 5/2002 | Yoshida et al. | 96/11 |
| 2002/0078827 | A1 | * 6/2002 | Thornton | 96/11 |
| 2003/0044519 | A1 | * 3/2003 | Takai | 427/77 |

OTHER PUBLICATIONS

PCT International Search Report dated Nov. 4, 2004.

* cited by examiner

*Primary Examiner*—Robert H. Spitzer
(74) *Attorney, Agent, or Firm*—Mark Krietzman, Esq.; Greenberg Traurig, LLP

(57) ABSTRACT

A method for reducing the surface variance of a porous metal substrate. The method does not significantly reduce the bulk porosity. The method can be used to reduce the surface pore diameter. A membrane, can be deposited on the reduced variance surface to form a separation membrane.

27 Claims, 2 Drawing Sheets

SURFACE MODIFICATION OF POROUS METAL SUBSTRATES

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates generally to the surface modification of substrates, and in particular, to a the surface modification of porous metal substrates, to receive a membrane, using an ion beam.

2. Description of Related Art

The growing popularity of portable electronic devices has produced an increased demand for compact and correspondingly portable electrical power sources to energize these devices. Developments in robotics and other emerging technology applications are further increasing the demand for small, independent power sources. At present, storage or rechargeable batteries are typically used to provide independent electrical power sources for portable devices. However, the amount of energy that can be stored in storage or rechargeable batteries is insufficient to meet the need of certain applications.

Hydrogen/air fuel cells (H/AFCs) have enormous potential as a replacement for batteries. Because they can operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly for portable application where small size and low weight are desirable.

A common H/AFC is a polymer electrolyte membrane (PEM) fuel cell. PEM fuel cells are constructed of an anode and a cathode separated by a polymer electrolyte membrane. Functionally, fuel cells generate electricity by reacting hydrogen with oxygen to produce water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to achieve the extremely low temperatures required to liquefy gaseous hydrogen. Furthermore, there are safety issues involved with the handling and storage of hydrogen in the compressed gas form or in the liquid form.

One method of producing hydrogen is by processing hydrocarbons such as methane (natural gas), propane, butane, and liquid fuels such as gasoline, diesel and JP-8 or oxygenates such as methanol. The choice of fuel and the choice of the method of processing, such as steam reforming, partial oxidation, and autothermal reforming, depends to a large extent on the type of service, such as, portable, stationary or automotive. Hydrogen can also be produced by cracking ammonia. The product stream from the fuel processor, when a hydrocarbon fuel is used, contains hydrogen in addition to unreacted hydrocarbons, other products such as CO, $CO_2$, and diluents such as nitrogen. In essence, the hydrogen concentration in the product stream can be in the 40 to 75 volumetric percent range depending on the type of fuel and the method of processing. Methods such as water gas shift and preferential oxidation are used to reduce the CO concentrations to acceptable levels of no more than 50 parts per million, but increase the complexity of the system.

One method of separating the hydrogen from the product stream concerns the use of hydrogen separation membranes. These membranes are in general composed of pure palladium or alloys of palladium and can either be supported or unsupported. Supports are usually porous ceramics with porosity in the 40 to 60 percent range. Commercial hydrogen separation membranes are unsupported and are tubular in nature. The separation membranes are composed of one tube or more than one tube that are bundled together and are designed to supply high purity hydrogen, that is, hydrogen which is greater than 99.9 percent pure. The separation membranes are generally limited to operating temperatures below 450° C. due to the sealing techniques used, which is inherent to tubular configurations, and are generally costly. To reduce costs, considerable efforts have been focused on supporting thin membrane layers on porous ceramic support, with porosity in the 40 to 60 percent range. The problem with porous ceramic supports is that the adherence of a metallic membrane to a nonmetallic ceramic substrate is a major problem, particularly when the supported membrane is exposed to thermal cycling between room temperature and elevated temperatures of no less than 400° C. In this case too, the ceramic supports that are evaluated are in the form of tubes, to mimic the construction and service of unsupported commercial membrane modules.

The hydrogen separation membrane, preferably made of pure palladium or palladium alloys, is deposited on the porous substrate by techniques such as electroless plating and electroplating. The substrate is exposed to the precursor metal salts of predetermined compositions in a deliberate fashion, and the salts are subsequently decomposed to yield a metal film or membrane on the support. Achieving a uniform pin-hole or crack free membrane is reportedly influenced by the surface morphology and pore size distribution of the ceramic support. In particular, a smooth substrate surface having small pores of no more than 1 micron in diameter and uniform pore size distribution are believed to be desirable. Small pores prevent wicking or seepage of the salt precursors through the pores. A smooth surface favors a uniform membrane deposition, however some level of roughness is needed to provide adhesion. The fact that these properties are possessed by ceramic substrates make them particularly attractive for experimentation and development efforts.

Relatively less focus and efforts have been directed towards the use of porous metal substrates. This is mainly because the porous sintered are relatively less porous than the ceramic substrates when compared at similar pore diameters, and therefore allows less gas flow for a defined pressure drop across a given substrate. For example, a porous stainless steel substrate rated as 0.2 micron grade (Mott, which means that the porous material can retain particles of average particle size 0.2 microns from a fluid stream) has a porosity of only about 7%, and that rated as 1 micron grade (Mott) has a porosity of about 30%. The synthesis and sintering process during the manufacture of the metal substrates does not allow for pore size and porosity to be varied independent of one another. In addition, the surface of metal substrates is relatively rough. Typically, techniques used to smoothen the surface, such as shot peening, results in pore closure and consequently decreases porosity and cause 'pitting' of the surface which can increase surface roughness.

In spite of the above negative characteristics, porous metal substrate based membranes represent a desirable feature for integration with a fuel processor for PEM cell applications. They have higher thermal conductivities than ceramics and therefore result in high heat transfer rates. They can be sealed in a relatively straightforward fashion using welding to components such as reactors, unlike ceramic substrates that need grafoil or soft metal gaskets. Inherently, the metal to metal adhesion of the membrane to the substrate can be expected to be better than that expected using metal-ceramic substrates.

Accordingly, it would be desirous to develop a method for preparing a porous metal substrate to support a separation membrane wherein the cost and complexity of manufacturing the membrane may be significantly reduced.

BRIEF SUMMARY OF THE INVENTION

According to one aspect of the present invention, a method for preparing a metal or metallic substrate surface to receive a membrane.

According to another aspect of the present invention, a method for controlling the pore size in the surface region of a metal or metallic substrate without substantially reducing bulk porosity.

According to another aspect of the present invention, a method for preparing a porous metal for membrane deposition. The method includes exposing a metal substrate to an ion beam, wherein the metal substrate has a principal surface and a variance, and wherein the variance is reduced, without substantially reducing bulk porosity, upon exposing the metal substrate to the ion beam.

According to another aspect of the present invention, a device for separating hydrogen from a hydrocarbon fuel processor is provided. The device includes a metal substrate, wherein a surface of the metal substrate has been previously exposed to an ion beam and a hydrogen separation membrane supported thereon.

Other features and advantages of the present invention will be set forth, in part, in the descriptions which follow and the accompanying drawings, wherein the preferred embodiments of the present invention are described and shown, and in part, will become apparent to those skilled in the art upon examination of the following detailed description taken in conjunction with the accompanying drawings or may be learned by practice of the present invention. The advantages of the present invention may be realized and attained by means of the instrumentalities and combinations particularly pointed out in the appendent claims.

Figure 1:
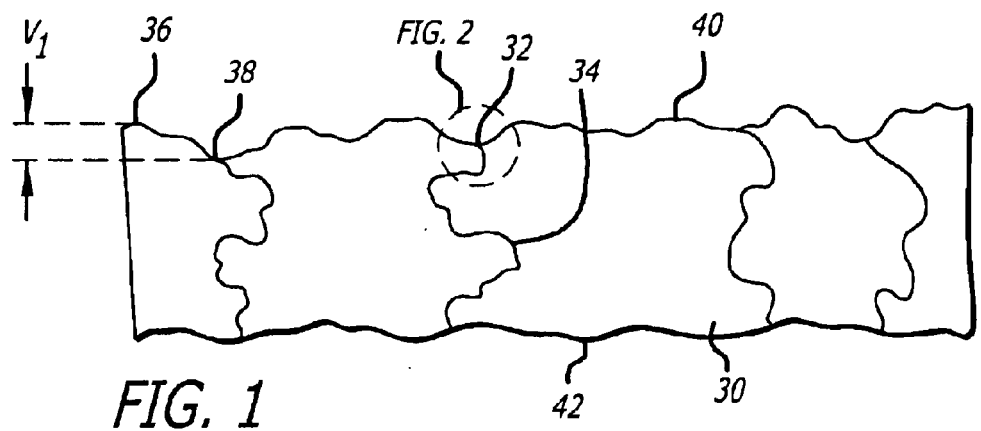
FIG. 1 illustrates a cross-sectional view of a porous metal substrate.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE PREFERRED EMBODIMENTS

The present invention discloses forming a separation membrane, such as a hydrogen separation membrane, for separating a product, such a hydrogen, from a mixed product stream including hydrogen, CO, $CO_2$ and hydrocarbons. The separation membrane includes a membrane on a porous metal substrate. To prepare the metal substrate for bonding to the membrane, a surface of the porous metal substrate is modified by exposing the porous metal substrate to an ion beam. Since surface modification of the metal substrate using ion beams extends to only a few microns in depth into the metal substrate, the surface roughness of the porous metal substrate is decreased without affecting the remainder of the metal substrate bulk porosity of the metal substrate. In some instance the surface pore diameter may be reduced also without affecting the remainder of the metal substrate bulk porosity of the metal substrate.

Figure 5:
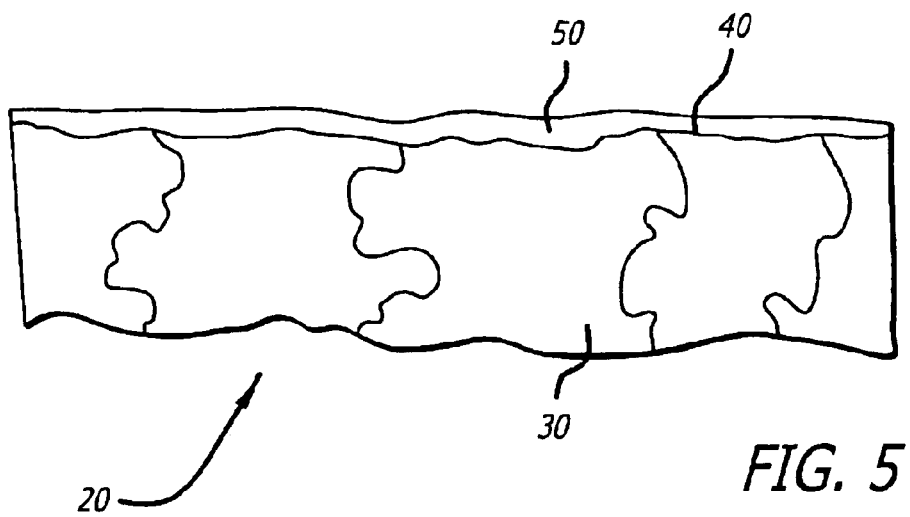
FIG. 5 illustrates a cross-sectional view of a membrane layer overlying the porous metal substrate shown in FIG. 4.

Shown in FIG. 5 is a separation membrane 20 which includes a membrane 50 on a metal substrate 30. Separation membrane 20 is used to separate a product, such a hydrogen, from a mixed product stream. A separation membrane 20 may be used to separate any combination of products from a product stream. Preferably, the separation membrane 20 is a hydrogen separation membrane used to separate hydrogen from the mixed product stream. Membrane 50 may be deposited on either side of a metal substrate (not shown) to provide a separation membrane with redundant membranes.

Figure 2:
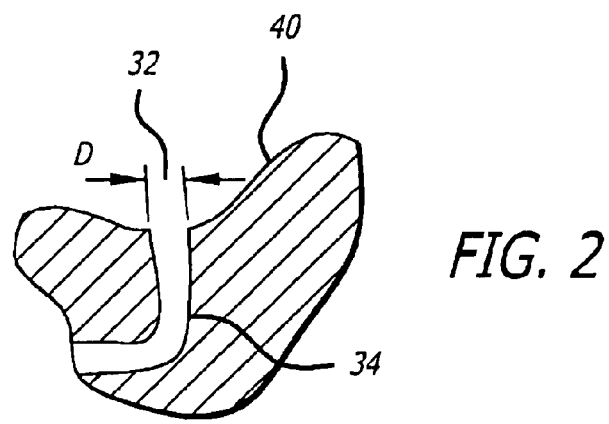
FIG. 2 illustrates an enlarged cross-sectional view of the porous metal substrate shown in FIG. 1.

Shown in FIG. 1, in cross-section, is the porous metal substrate 30 prior to processing for use as part of the separation membrane 20. The metal substrate 30 has a principal surface 40 opposed to a second surface 42. The thickness of the metal substrate 30 is determined by the average distance from the principal surface 40 to the second surface 42. Preferably, the thickness of the metal substrate 30 is between about 0.5 and about 3 millimeters. The metal substrate 30 also comprises a series of pores 32 that form channels 34 through the metal substrate 30. As defined herein, the pores 32 define openings to the channels 34. The diameter D of the pores 32, in the metal substrate at the surface region 41 and the body region 43 are substantially the same before exposure to the ion beam as, illustrated in FIG. 2. Before treatment with the ion beam, preferably, the diameter D of pores 32 is between about 0.2 and about 100 microns, and more preferably between about 15 and about 50 microns.

The bulk porosity of the metal substrate 30 can be described by a Darcy value (For example, a value of 1.0 represents a flow of 1 cc of 1 cP (viscosity) fluid in 1 second at 1 atmosphere pressure through a 1 cm2×1 cm thick section of porous media.). The range of Darcy value for metal substrates which may be suitable for surface modification is between 0.1 and 100.

Preferably the bulk porosity of the metal substrate 30, before and after exposure to the ion beam is between about 7% and about 60%, more perfectly the bulk porosity is greater than about 30% which corresponds to a Darcy value of about 0.22.

The principal surface 40 of the metal substrate 30 consists of a series of peaks and valleys. The variance V of the metal substrate 30 is a measure of the surface roughness determined by the measuring the distance between the tallest peak and lowest valley in the principal surface 40. The initial variance $V_1$ of the metal substrate 30 is defined herein as the distance between the tallest initial peak 36 and the lowest initial valley 38. Preferably, the initial variance $V_1$ of the metal substrate 30 is between 1 and 50 microns.

Figure 3:
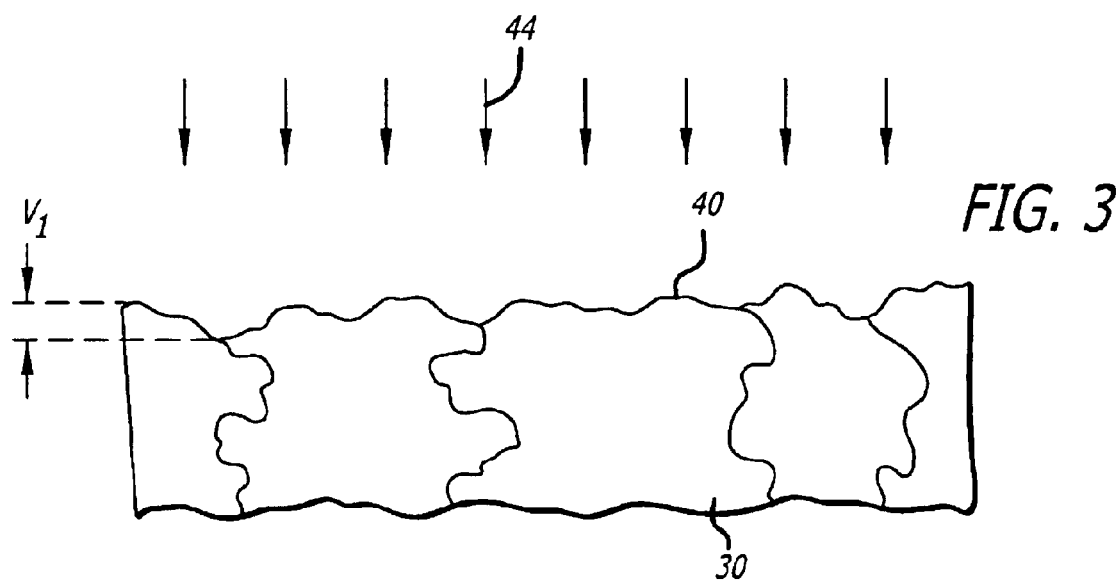
FIG. 3 illustrates a cross-sectional view of the porous metal substrate shown in FIG. 1 being exposed to ion beams.

In order to reduce the variance V which will increase uniformity and/or smoothness in the principal surface 40, the principal surface 40 is modified by exposing the principal surface 40 to ion beams 44, as illustrated in FIG. 3. For example, the metal substrate 30 may be placed in a pulsed ion beam chamber, and subjected to Ion Beam Surface Treatment. QM Technologies in Albuquerque, N.Mex. provides such Ion Beam Surface Treatment. Once inside the ion beam chamber, ion beams 44 are generated and directed at the principal surface 40 of the metal substrate 30. The energy and duration of the ion beams may be modified depending on the desired results. For example, in order to reduce the variance (surface roughness) of a metal substrate 30. Preferably to an average variance of less than about 10 microns, more preferably to an average variance of less than about 5 microns and most preferably to a variance of about 1 microns.

To reduce the average variance the metal substrate 30 is be exposed to ion beams 44 having an energy of between 1 to 10 J/cm$^2$ for a duration of 100 to 150 nano-seconds per pulse; the treatment comprising between 1 and 10 pulses. The optimal energy and duration of the output will vary with the composite of the metal substrate and/or its initial porosity.

Figure 4A:
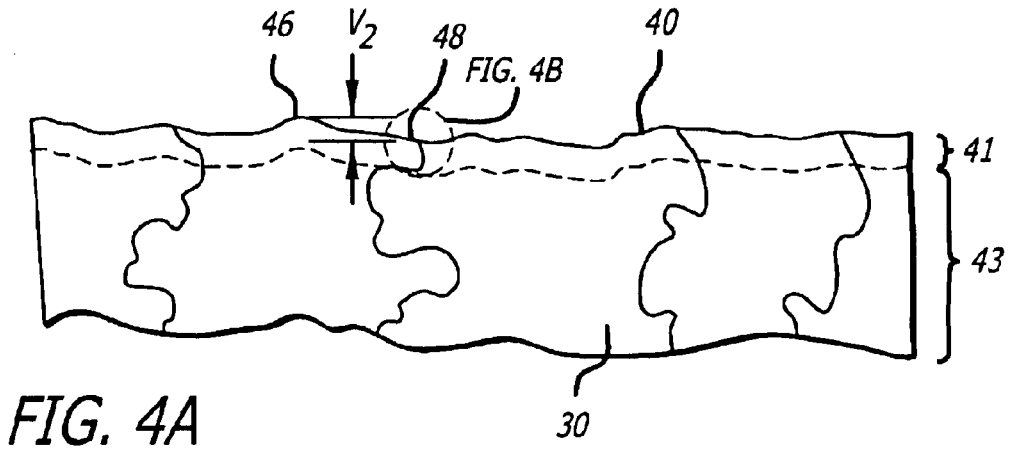
FIG. 4A illustrates a cross-sectional view of the porous metal substrate shown in FIG. 3 upon exposure to ion beams.

Once exposed to the ion beams, the variance V is reduced from the initial variance $V_1$ to a reduced variance $V_2$. The reduced variance $V_2$ of the metal substrate 30 is defined herein as the distance between the tallest reduced peak 46 and the lowest reduced valley 48, as illustrated in FIG. 4A. Preferably, the initial variance $V_1$ is reduced by about fifty percent upon exposing the metal substrate 30 to the ion beam 44. Preferably, the reduced variance $V_2$ of the metal substrate 30 is between 1 and 5 microns.

Figure 4B:
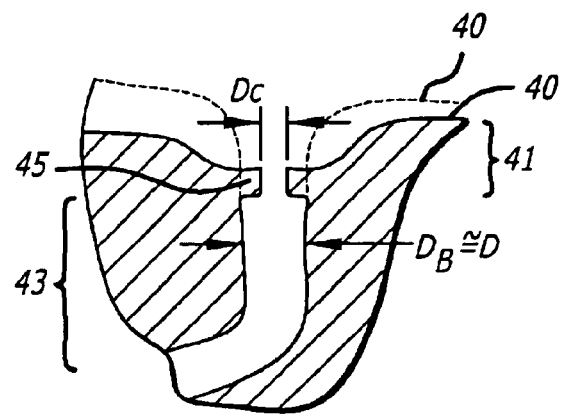
FIG. 4B illustrates an enlarged cross-sectional view of the porous metal substrate shown in FIG. 4A.

Because the ion beam only extends a few microns into the surface region 41 into the metal substrate 30, wherein it heats up and melts the surface region 41, exposure of the metal substrate 30 to an ion beam 44, can reduce the initial variance $V_1$ or surface roughness of the principal surface 40 without substantially altering the bulk porosity of the metal substrate 30. As shown in FIG. 4B, exposure to the ion beam also has an insubstantial effect on the average diameter $D_B$ of the pore size, in the body region 43 of the metal substrate 30. Thus, exposing the metal substrate 30 to ion beams 44 allows the variance $V_1$ of the principal surface 40 to be reduced before depositing a membrane 50. Upon reducing the variance V of the metal substrate 30 from the initial variance $V_1$ to the reduced variance $V_2$, a membrane 50 can be deposited on the principal surface 40 of the metal substrate 30 fanning the separation membrane 20.

The above described exposure to the ion beam does not substantially reduce the bulk porosity of the metal substrate 30. However, in some case the exposure to ion beams can also reduce the average surface pore size $D_C$ in the surface region 41 while the average pore diameter $D_B$ in the body region 43 is substantially unaltered. Thus maintaining the bulk porosity. As shown in FIG. 4B the alteration of the average coating pore size $D_C$ in the surface region 41 forms a "bottleneck" 45. Preferably the exposure to the ion beam is sufficient to reduce the average coating pore size $D_C$ in the surface region to about 10 to 20 microns, more preferably to about 5 to 10 microns and most preferably to about 1 to 5 microns. Thereafter, as shown in FIG. 5 a membrane 50, such as a hydrogen separation membrane, can be deposited on the principal surface 40. Preferably, the membrane 50 has a thickness of between 1 and 10 microns.

A membrane 50 formed of pure palladium or palladium alloys, is useful to separate hydrogen gas, from a mixed product stream. Such a palladium or palladium alloy membrane is commonly deposited by techniques that include, but not limited to electroless plating and electroplating. During electroless plating, the substrate is exposed to the precursor metal salts of predetermined compositions in a deliberate fashion, and the salts are subsequently decomposed to yield a metal film or membrane on the metal substrate 30. Small pore size in the surface region 41 favors uniform membrane 50 deposition. Small pores prevent winking or seepage of the salt precursors through the pores.

Preferably, a palladium or alloys of palladium the membrane 50 has a thickness of between 1 and 10 microns. In general, the forming of a thinner membrane saves costs and materials. From a process standpoint, a thinner membrane is preferred as the hydrogen flux (flow rate per unit are) through the membrane is inversely proportional to membrane thickness. Additionally, if the membrane is applied in excess of about 20 microns it can lead to process inefficiencies and higher costs, particularly when the hydrogen separation device is part of the fuel processor for producing hydrogen.

If the membrane deposited on the ion beam treated surface is found to contain some minor holes or defects, additional ion beam treatments can be used to minimize such defects by melting membrane into these defects as a finishing step.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

What is claimed is:

1. A separation membrane comprising:
    a metal substrate with pores extending therethrough, with a principal surface having been previously exposed to an ion beam;
    a variance on the principal surface;
    a body region of the porous metal substrate;
    a surface region of the metal substrate extending from the body region to the principal surface; and,
    a membrane deposited on the principal surface.

2. The separation membrane of claim 1, wherein the membrane is permeable to hydrogen.

3. The separation membrane of claim 1, wherein the portion of the pores in the surface region have a smaller average diameter than the pores in the body region.

4. The separation membrane of claim 1, wherein the metal substrate, before exposure to the ion beam, had an average pore size between about 1 and about 100 microns.

5. The separation membrane of claim 1, wherein the variance on the principal surface is about fifty percent less than it was prior to exposure to the ion beam.

6. A hydrogen separation membrane comprising:
   a metal substrate with a reduced principal surface variance having been previously exposed to an ion beam:
   pores extending through the porous metal substrate;
   a body region of the porous metal substrate with an average pore size;
   a surface region of the porous metal substrate extending from the principal surface with an average pore size smaller in diameter than the average pore size of the body region pores; and,
   a membrane containing at least some palladium deposited on the principal surface, whereby the membrane is permeable to hydrogen.

7. A separation membrane comprising:
   a metal substrate with pores extending from a primary surface to a second surface, at least one of the primary and second surfaces having been previously exposed to an ion beam, and,
   a membrane deposited on a surface which had previously been exposed to an ion beam.

8. The separation membrane of claim 7 wherein the membrane is permeable to hydrogen.

9. A porous metal substrate with a reduced variance to receive a membrane comprising:
   a metal substrate that has been previously exposed to an ion beam, with pores extending therethrough; and,
   a principal surface with a variance which has been reduced by the exposure to the ion beam.

10. The porous metal substrate of claim 9, wherein the metal substrate, before exposure to the ion beam, had an average pore size greater than about 0.2 microns.

11. The porous metal substrate of claim 9, wherein the metal substrate has a variance on the principal surface that is about fifty percent less than it was prior to exposure to the ion beam.

12. A method for preparing the surface of a porous metallic substrate with a surface region and a body region for membrane deposition the method comprising exposing a porous metal substrate to an ion beam.

13. The method of claim 12, wherein:
   the porous metal substrate has a nominal bulk porosity, before exposure to the ion beam, of between about 7 and about 60 percent; and
   the average body region pore diameter is substantially the same as the avenge surface region diameter.

14. The method of claim 13 wherein: upon exposure to the ion beam the average body pore diameter is larger than the average surface region pore diameter.

15. The method of claim 12 further comprising depositing a membrane on the surface of the porous metallic substrate after exposure to the ion beam.

16. The method of claim 15, wherein the membrane contains at least some palladium.

17. The method of claim 16, wherein the membrane is permeable to hydrogen.

18. A method for preparing the surface of a metallic substrate to receive a membrane, the method comprising:
   exposing a metal substrate with a principal surface and a variance to an ion beam; and, reducing the variance by exposing the metal substrate to the ion beam.

19. The method of claim 18, wherein:
   the metal substrate, prior to exposure to the ion beam, has a bulk porosity of between about 7 and about 60 percent; and,
   the metal substrate, subsequent to exposure to the ion beam, has a bulk porosity of between about 7 and about 60 percent.

20. The method of claim 18, wherein:
   the metal substrate, prior exposure to the ion beam, has a Darcy value of between 0.1 and 100; and,
   the metal substrate, subsequent to the exposure to the ion beam, has a Darcy value of between 0.1 and 100.

21. The method of claim 18, wherein the average diameter of the pores at the surface region is reduced after exposure to the ion beam.

22. The method of claim 18, further comprising depositing a membrane on the principle surface of the metal substrate.

23. The method of claim 22, wherein the membrane comprises palladium.

24. The method of claim 18, wherein the metal substrate has a thickness of between about 0.5 and about 3 millimeters.

25. The method of claim 18, wherein the metal substrate has bulk porosity of between about 7 and about 60 percent.

26. A method for producing a separation membrane, the method comprising:
   exposing at least one surface of a metal substrate with a variance on the surface to an ion beam;
   reducing the surface variance by the exposure to the ion beam;
   depositing a separation membrane on the surface with the reduced variance; and
   exposing the deposited separation membrane to an ion beam.

27. The method of claim 26 wherein the membrane is permeable to hydrogen.

* * * * *